United States Patent [19]
Huynh et al.

[11] Patent Number: 5,285,372
[45] Date of Patent: Feb. 8, 1994

[54] POWER SUPPLY FOR AN OZONE GENERATOR WITH A BRIDGE INVERTER

[75] Inventors: Anh N. Huynh, Cincinnati, Ohio; Phovios D. Ziogas, Brossard, Canada

[73] Assignee: Henkel Corporation, Ambler, Pa.

[21] Appl. No.: 781,793

[22] Filed: Oct. 23, 1991

[51] Int. Cl.$^5$ ........................................... H02M 7/5387
[52] U.S. Cl. ................................ 363/132; 422/186.16
[58] Field of Search ................. 363/17, 28, 98, 132; 422/186.16; H02M 7/5387

[56] References Cited

U.S. PATENT DOCUMENTS

| | | | |
|---|---|---|---|
| 4,156,653 | 5/1979 | McKnight | 250/533 |
| 4,424,557 | 1/1984 | Steigerwald | 363/98 |
| 4,680,694 | 7/1987 | Huynh et al. | 363/136 |
| 4,752,866 | 7/1988 | Huynh et al. | 363/138 |
| 4,779,182 | 10/1988 | Mickal et al. | 363/37 |
| 4,794,506 | 12/1988 | Hino et al. | 363/25 |
| 4,855,888 | 8/1989 | Henze et al. | 363/17 |
| 4,864,479 | 9/1989 | Steigerwald et al. | 363/17 |
| 4,864,483 | 9/1989 | Divan | 363/37 |
| 4,894,763 | 1/1990 | Ngo | 363/35 |
| 4,912,622 | 3/1990 | Steigerwald et al. | 363/98 |
| 5,157,592 | 10/1992 | Walters | 363/17 |
| 5,208,738 | 5/1993 | Jain | 363/17 |

OTHER PUBLICATIONS

Schwarz et al, "A 95-Percent Efficient IKW DC Converter With An Internal Frequency of 50 KHz", IEEE Trans. on Ind. Electron. & Control Instrumentation, vol. IECI-25, No. 4, pp. 326-333, Nov. 1978.

S. Magai, A. Chibani, M. Nakooka, and H. Ogiwara; "A New Phase-Shifting PWM Regulated-Mode Resonant Inverter Using Static Induction Power Devices for Induction-Heating-and-Melting Applications"; *EPE '89 3rd European Conference On Power Electronics and Applications*, vol. 1, dated Oct. 9 through 12, 1989, pp. 347-352.

*Primary Examiner*—William H. Beha, Jr.
*Attorney, Agent, or Firm*—Ernest G. Szoke; Wayne C. Jaeschke; Kenneth Watov

[57] ABSTRACT

A full bridge switching power supply is coupled to an ozonator load via a series resonant circuit having a resonant frequency above the switching frequency. Power output is controlled by varying the duration of the times when diagonal switches are conducting, and the output voltage has a longer rise time than fall time due to there being intervals between the conduction periods of diagonal switches during which one of the switches is turned on to permit resonant current flow. The driving voltages for attaining this action are symmetrical rectangular waves of identical shape having different phases that are derived from out of phase pulses where width is varied by the timing of their trailing edges.

11 Claims, 6 Drawing Sheets

POWER SUPPLY FOR AN OZONE GENERATOR WITH A BRIDGE INVERTER

BACKGROUND

1.0 Field of the Invention

This invention relates to a solid state power supply that is particularly adapted for driving an ozone generator.

2.0 Discussion of Related Art

One of the most efficient ways for producing ozone, $O_3$, is to subject oxygen, $O_2$, or a gas containing a high concentration of $O_2$ to a corona discharge. This corona discharge can be produced by applying a cyclic voltage to spaced electrodes. Ozone is generally produced during the portion of a cycle occurring just prior to a peak. Therefore, more ozone is produced by increasing the frequency, but a point is reached when the power dissipated in the gap between the electrodes tends to cause the ozone molecules of $O_3$ to break down into oxygen molecules $O_2$.

A brief review of the teachings of prior references now follows. McKnight, U.S. Pat. No. 4,156,653, teaches a power supply circuit for an ozonator that is powered by a three-phase input voltage.

Huynh et al. U.S. Pat. No. 4,680,694 teaches a full-wave inverter using four thyristor switching elements $T_1$ through $T_4$. It is indicated that the thyristors are preferably provided by SCRs. Bilateral diodes are also connected in parallel across the thyristors.

Huynh et al. U.S. Pat. No. 4,752,866 teaches an ozonator power supply that includes a full wave rectifier for rectifying a three phase voltage, and a full wave bridge inverter using four thyristor switching elements for synthesizing the rectified voltage or DC into an AC waveform for application to the ozonator. A current pulse amplitude control circuit 43 for controlling the conduction of the pass transistor used to control the amplitude of the current pulses. A pulse width control logic and drive circuit 45 are used for controlling the operation of the thyristor switches $T_1$ through $T_4$ in a manner providing pulse width control.

Mickal et al. U.S. Pat. No. 4,779,182 teaches a three phase power supply circuit to supply power to an electrostatic filter. As shown in the figures, a three phase AC voltage is rectified by a full wave rectifier and applied to a full wave thyristor inverter circuit. Transformer coupling is used between the inverter and the electrostatic filter.

Divan U.S. Pat. No. 4,864,483 shows a static inverter for inverting a DC voltage to a three phase AC voltage. The inverter includes a full-wave transistorized inverter with bilateral diodes connected across the collector and emitter electrodes of each transistor.

Ngo U.S. Pat. No. 4,894,763 teaches an AC to AC converter type power supply circuit. As shown in the figures, a three phase full-wave rectifier circuit 12 including a plurality of CMOS switching elements is used to rectify the three phase input voltage. The DC voltage that is provided by the rectifier 12 is switched via a CMOS switching circuit 50 into a polyphase inverter circuit 18. The inverter 18 is a three phase inverter for converting the DC voltage back into synthesized three phase AC output voltages.

3.0 Brief Summary of the Invention

The objects of the invention are:

1. To provide a versatile and reliable pulse-width-modulated (PWM) voltage source inverter power supply with zero voltage switching scheme for an ozonator which results in the efficient operation.

2. To provide a control circuit for a transistor bridge inverter power supply for an ozonator, wherein the ozonator load power can be controlled by the width of the inverter output voltage. Therefore, the input power factor is close to unity and independent of the power loading.

3. To provide an ozonator load voltage, wherein the rise time of the ozonator voltage waveform is substantially longer than the fall time of the ozonator voltage waveform.

In accordance with this invention, the voltage wave applied to an ozonator has a sawtooth shape with a slow rise and a fast fall so that a corona discharge is produced for a greater portion of a cycle than would be the case for a sinusoidal wave. In order to obtain best results, the frequency and amplitude of the sawtooth waves are controllable.

A voltage source inverter power supply circuit of one embodiment of this invention is comprised of a three phase bridge rectifier to convert a three phase 60 Hz power source to a DC power source, a capacitor connected across the DC power source to smooth the output DC current and to maintain the DC bus voltage, a DC/DC converter with a soft start circuit (not shown) and a transistor bridge inverter connected to the DC power source by its input and to an electrical network by its outputs and capacitors connected across the bridge inverter input to filter the high frequency noise. The electrical network includes a step up high voltage transformer with its primary low voltage winding connected to the output of the transistor bridge inverter through a series resonant circuit comprising a capacitor and an inductor connected in series, and through its secondary high voltage winding for to the ozonator load.

The inductor provides a limitation of high frequency output harmonics and short circuit limiting while the capacitor is used to block out any DC components from the output of the transistor inverter. The ozonator load has an electrical equivalent circuit comprising resistors and capacitors connected as shown inside the dashed rectangle of FIG. 1. $Cg_1$ and $Cg_2$ represent air gap capacitors, $Cd$ represents a glass dielectric capacitor, $Rd$ represents a glass dielectric loss resistor and $Rg_1$ and $Rg_2$ represent a air gap resistor which provides a conductance path when a corona discharge occurs. The step up high voltage transformer and the series inductor-capacitor circuit in combination with the ozonator load form a resonant circuit having its natural frequency above the switching frequency.

In operation, forced-commutation is provided by a control circuit. The inverter output voltage has three levels of voltage pulse $+V_{DC}$, zero, $-V_{DC}$. During a positive half cycle, the output voltage level $+V_{DC}$ is obtained by firing a first pair of diagonal transistors that conduct current in one direction through the electrical network. The following zero level of the inverter output voltage is obtained by turning off one of the first pair of transistors and firing one of the second pair of transistors. In the negative half cycle, the output voltage level $-V_{DC}$ is obtained by turning on a second pair of diagonal transistors and turning off the first pair of diagonal transistors so as to conduct current in reverse direction through the electrical network. The following zero level of the inverter output voltage is obtained by turning off one of the second pair of transistors and firing one of the first pair of transistors. A cycle of the inverter output voltage is now complete. The action is repeated to produce the next cycle. A control circuit generates base drive control signals for the first and second pairs of transistors. The base drive control signals control the width of the positive inverter output voltage pulses supplied to the ozonator load by firing the first pair of transistors for a period of time, and then turning one of the first pair of transistors off by controlling the timing of its base drive control signal and firing one of the second pair of transistors by controlling the timing of its base drive control signal. Similarly, the base drive control signals control the width of the negative inverter output voltage pulses supplied to the ozonator load by turning the second pair of transistors on for a period of time, and then turning one of the second pair of transistors off by controlling the timing of its base drive control signal and firing one of the first pair of transistors by controlling the timing of its base drive control signal.

The control circuit includes a pulse width modulator integrated circuit for producing the first and second interleaved square wave cycle signals, and the widths of the pulses in the first and second square wave signals are adjustable to change the timing of the base drive control signals. The pulse width modulator integrated circuit is also controllable to control the frequency of the first and second out of phase square wave signals.

BRIEF DESCRIPTION OF THE DRAWINGS

Various embodiments of the present invention are described with reference to the following drawings, in which like items have the same reference designation, wherein.

DETAILED DESCRIPTION OF THE INVENTION

Figure 1:
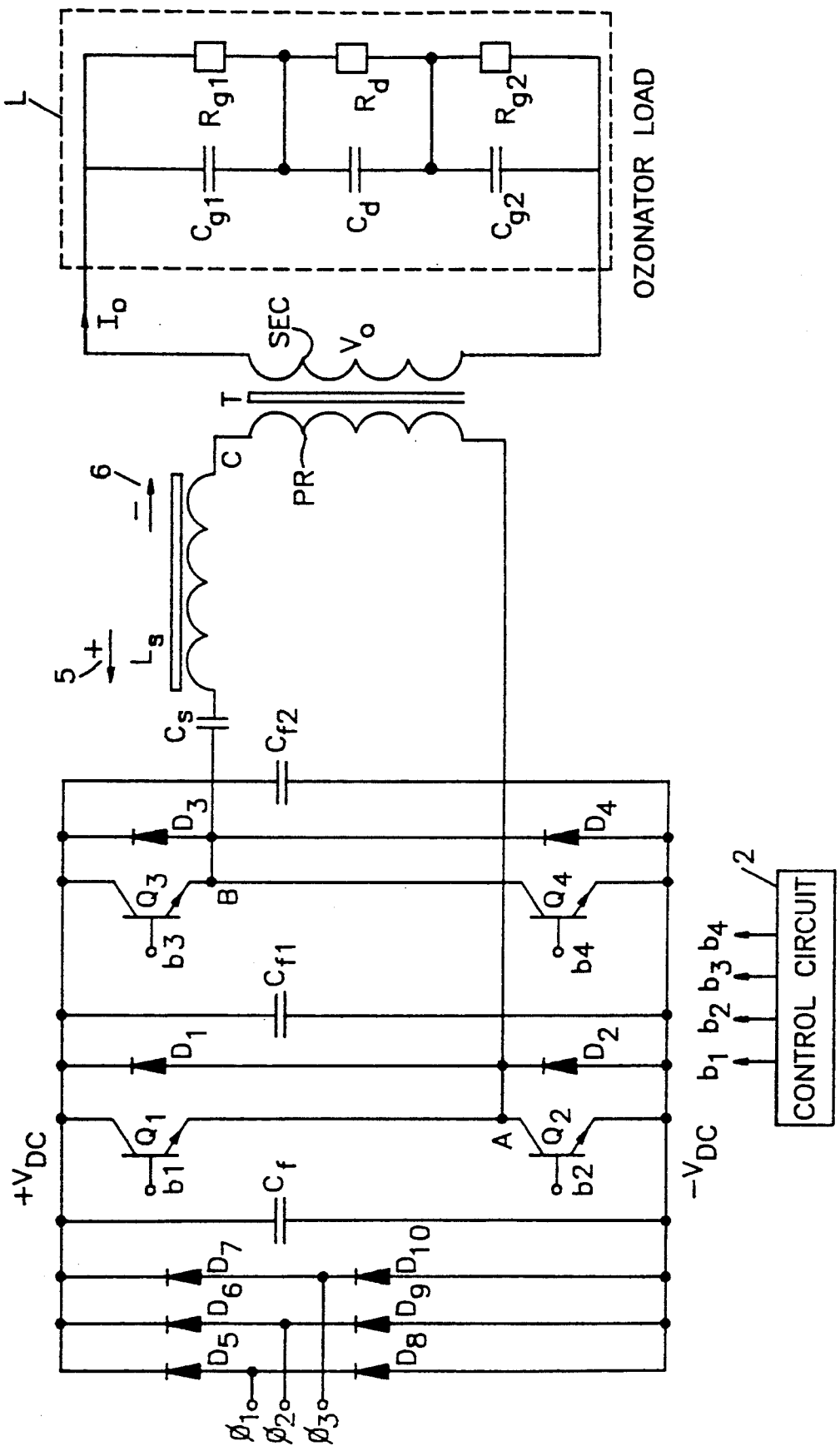
FIG. 1 is a simplified electrical schematic diagram of a power circuit with which the invention may be used.
Figure 2:
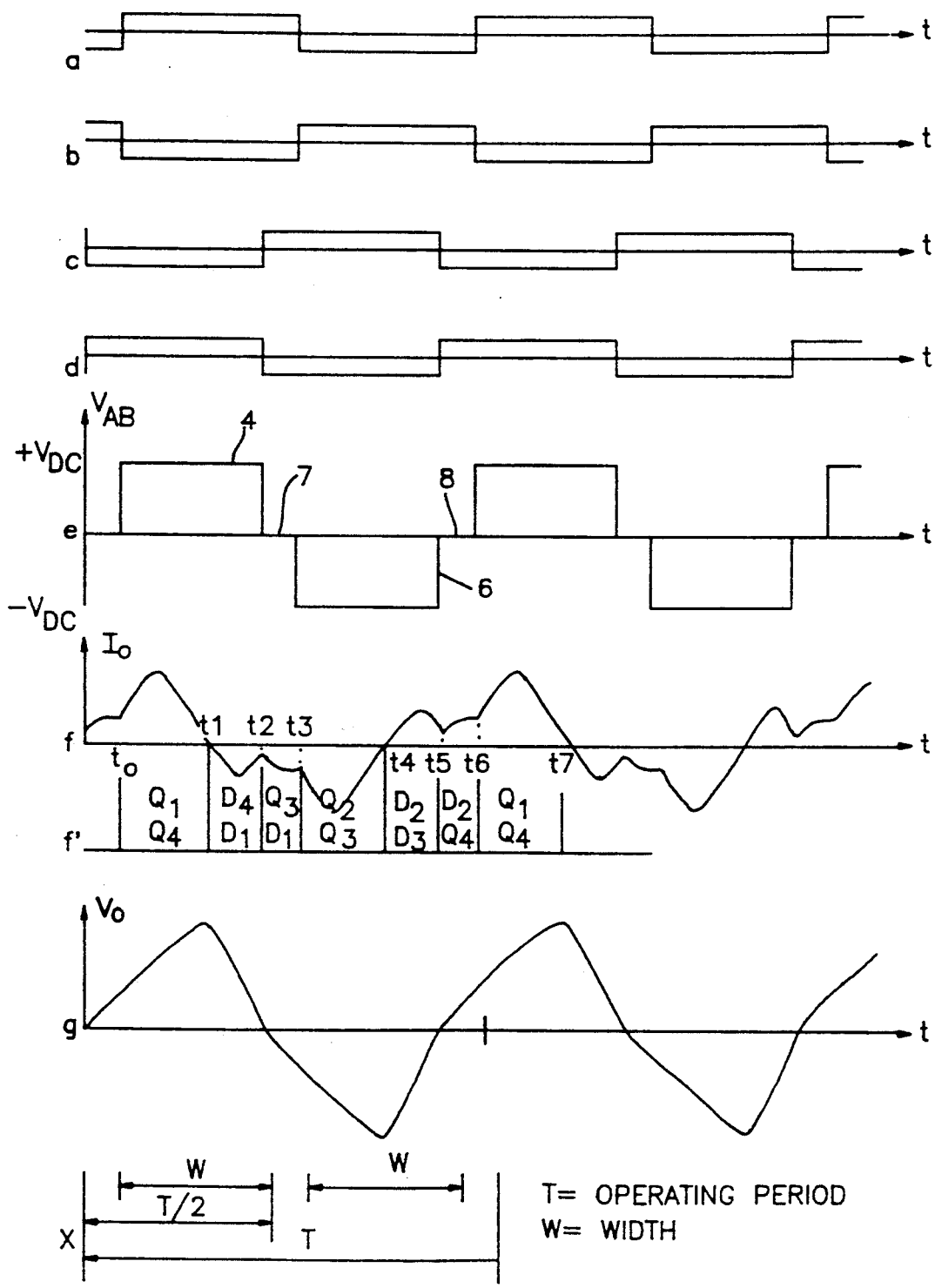
FIG. 2 illustrates various waveforms which are associated with and are useful in explaining the operation of the PWM voltage source inverter circuit of FIG. 1 in a pulse width modulated mode of operation.

Reference is made to the schematic diagram of FIG. 1 of a power supply incorporating one embodiment of this invention, and to the waveforms of FIG. 2 that are used in explaining its operation. Diodes D5–D10 are coupled as shown to the terminals $\phi_1$, $\phi_2$ and $\phi_3$ of a three phase AC power source so as to provide DC voltages $+V_{DC}$, and $-V_{DC}$ on opposite sides of capacitors Cf, $Cf_1$, and $Cf_2$.

Transistors $Q_1$ and $Q_2$ are connected in series in the order named so as to conduct current between $+V_{DC}$ and $-V_{DC}$ when biased for conduction. The emitter of $Q_1$ and the collector of $Q_2$ meet at a junction A, and diodes $D_1$ and $D_2$ are respectively connected in anti-parallel with $Q_1$ and $Q_2$, i.e. they conduct in the opposite direction. Transistors $Q_3$ and $Q_4$ are connected between $+V_{DC}$ and $-V_{DC}$ in the same manner as $Q_1$ and $Q_2$. The emitter of $Q_3$ and the collector of $Q_4$ meet at junction B, and diodes $D_3$ and $D_4$ are respectively connected in anti-parallel with them. A control circuit 2 supplies control signals to the base electrodes $b_1$, $b_2$, $b_3$ and $b_4$ of $Q_1$, $Q_2$, $Q_3$ and $Q_4$, respectively, that may be derived in accordance with one aspect of this invention as will be explained in connection with FIG. 3.

A primary winding PR of a step-up transformer T is connected in series with an inductor $L_s$ and a capacitor $C_s$ between the junctions A and B, having a voltage shown in FIG. 2e produced across it in a manner to be explained. Transformer T has a secondary winding SEC having a voltage shown in FIG. 2g produced across it in a manner to be explained is coupled to a load and shown within a dashed rectangle L that is a schematic representation of the equivalent circuit of an ozonator.

With the control waves of FIGS. 2a, 2b, 2c and 2d respectively applied to be base electrodes b1-b4, $Q_1$ and $Q_4$ are both biased for conduction during the positive pulses of the wave of FIG. 2e, and both $Q_2$ and $Q_3$ are biased for conduction during the negative pulses that are interleaved with the positive pulse and spaced from them. The first positive pulse 4 occurs between the time $t_0$ and $t_2$ shown in the waveform of FIG. 2f for the current $I_0$ that flows in the secondary winding s. A sine wave of current $I=NI_0$, where N is the turns ratio of the secondary winding s to the primary winding PR, flows in a positive direction, indicated by an arrow 5 of FIG. 1 from $+V_{DC}$ to $-V_{DC}$ through $Q_1$, $L_s$, $C_s$, the primary PR and $Q_4$. Because series resonance occurs between the junctions A and B at a higher frequency than the frequency of the rectangular waves in FIG. 2e, the current swings from positive to negative, arrow 6 of FIG. 1, at $t_1$ while $Q_1$ and $Q_4$ are still conducting. This negative current flows from $-V_{DC}$ to $+V_{DC}$ through $D_4$, $C_s$, $L_s$, PR and $D_1$. These currents in the positive and negative directions establish the first half cycle of positive ozonator load voltage $V_0$ shown in FIG. 2g.

At $t=T/2$, $Q_4$ is turned off and, FIG. 2d, and $Q_3$ is turned on, FIG. 2c. No voltage appears between the junctions A and B, but the current continues to flow through $D_1$, $Q_3$, $L_s$, $C_s$ and PR between $t_2$ and $t_3$ so as to establish that part of a second half cycle of the negative ozonator load voltage $V_0$ of FIG. 2g.

At $t_3$, $Q_1$ is turned off, FIG. 2a, and $Q_2$ is turned on, FIG. 2b, so as to produce a negative voltage pulse 6 of FIG. 2e between the junctions A and B. After $t_3$, the sine wave current $I_0$ continues to flow in a negative direction through $Q_3$, $L_s$, $C_s$, PR, and $Q_2$. At $t_4$, the current swings in a positive direction from $-V_{DC}$ to $+V_{DC}$ through $D_2$, p, $L_s$, $C_s$ and $D_3$ so as to establish the remaining part of the negative half cycle of ozonator voltage. At $t_5$, $Q_3$ is turned off, FIG. 2c, and $Q_4$ is turned on again, FIG. 2d. Again no voltage appears between the junctions A and B, but current flows through $D_2$, PR, $L_s$, $C_s$, and $Q_4$ until $t_6$ so as to establish the first part of a positive half cycle of ozonator voltage $V_0$. At $t_6$, $Q_2$ is turned off and $Q_1$ is turned on so that a point like that at $t_0$ has been reached.

FIG. 2f indicates the devices through which current is flowing at different times.

In a supply incorporating the invention, the frequency of $V_0$ of FIG. 2g is adjustable between 70 Hz and 800 Hz and the pulse width of $V_{AB}$, FIG. 2e, is adjustable from one tenth of a half of a cycle to one half cycle. The frequency is set below the natural frequency of the resonant circuit comprising the combination of $L_rC_r$, the transformer T, and the ozonator load L.

Because the series resonance is at a higher frequency than the switching frequency and because of the conduction of $Q_3$ and $Q_4$ during the intervals like 7 and 8 of FIG. 2e, the positive voltage $V_0$ and the negative voltage $V_0$ both have a longer rise time than a fall time so as to increase the efficiency with which ozone is produced. As previously noted, this is because ozone is produced from the time a given voltage level is reached until the peak, and this time is greater when the increase in voltage during the first part of each half cycle has a lower slope than the decrease in voltage.

Description of the Control Circuit

Figure 3:
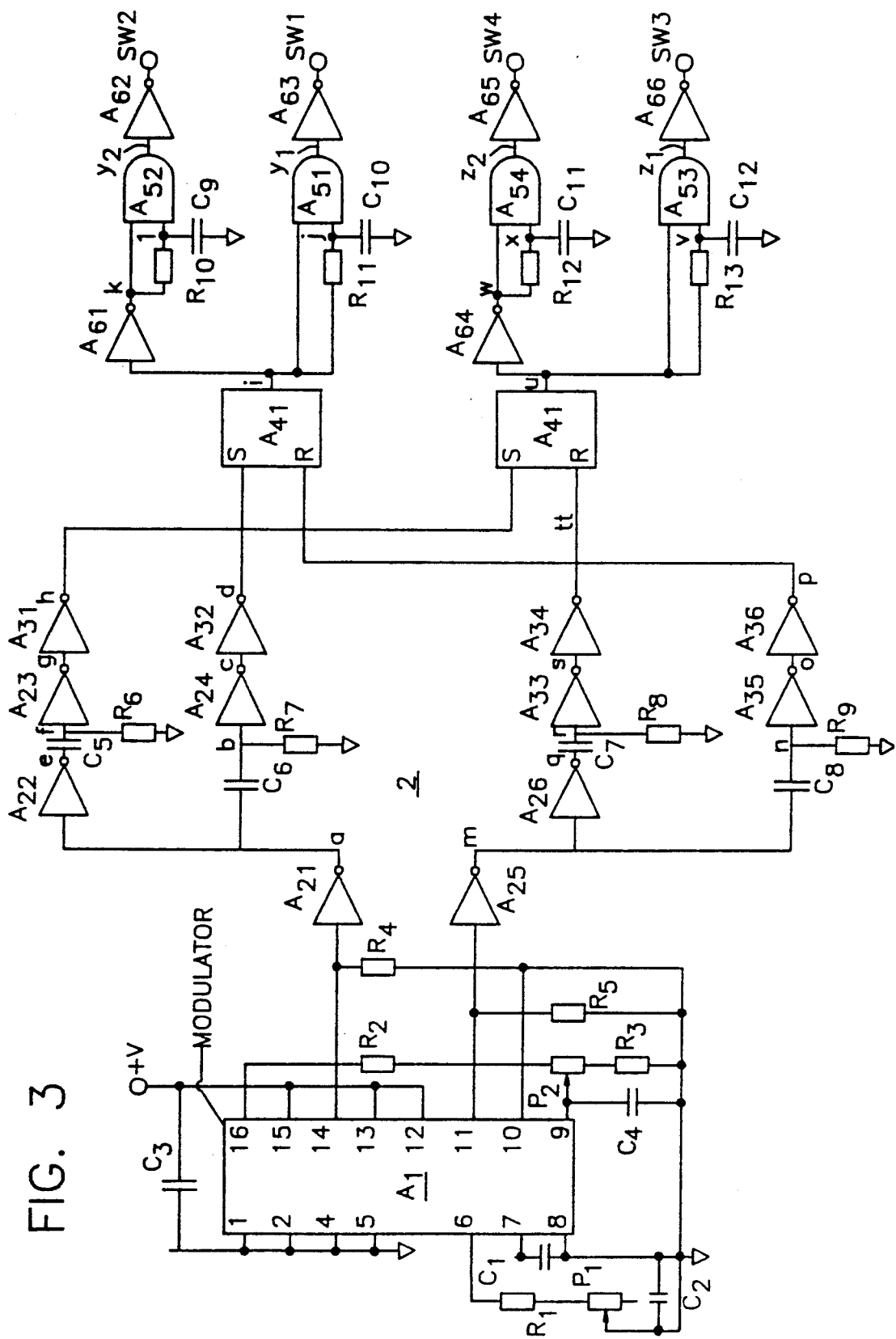
FIG. 3 illustrates an electrical schematic diagram of a control circuit which generates four base drive control signals.
Figure 4A:
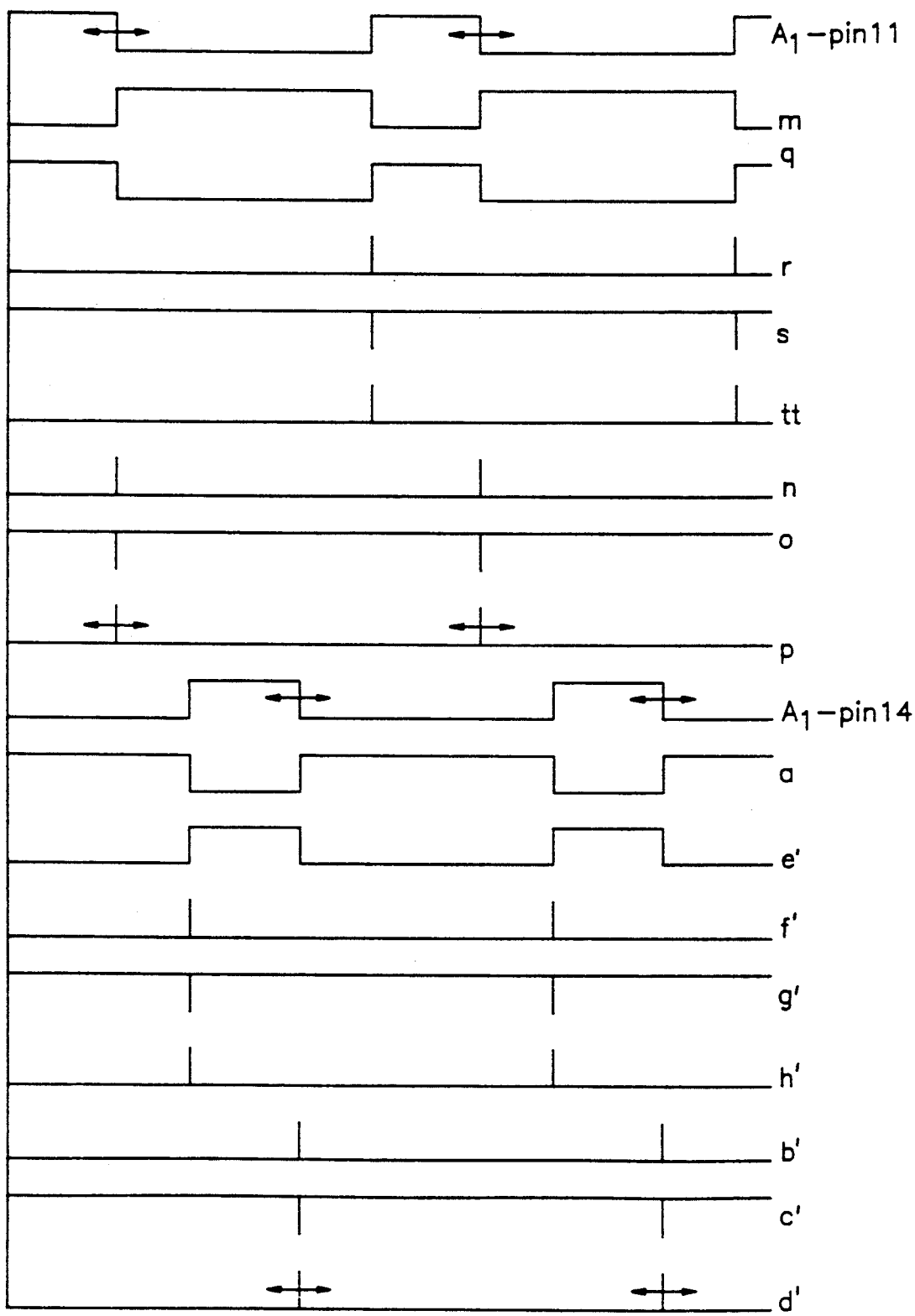
FIG. 4a illustrates a first half of logic signals of the control circuit.
Figure 4B:
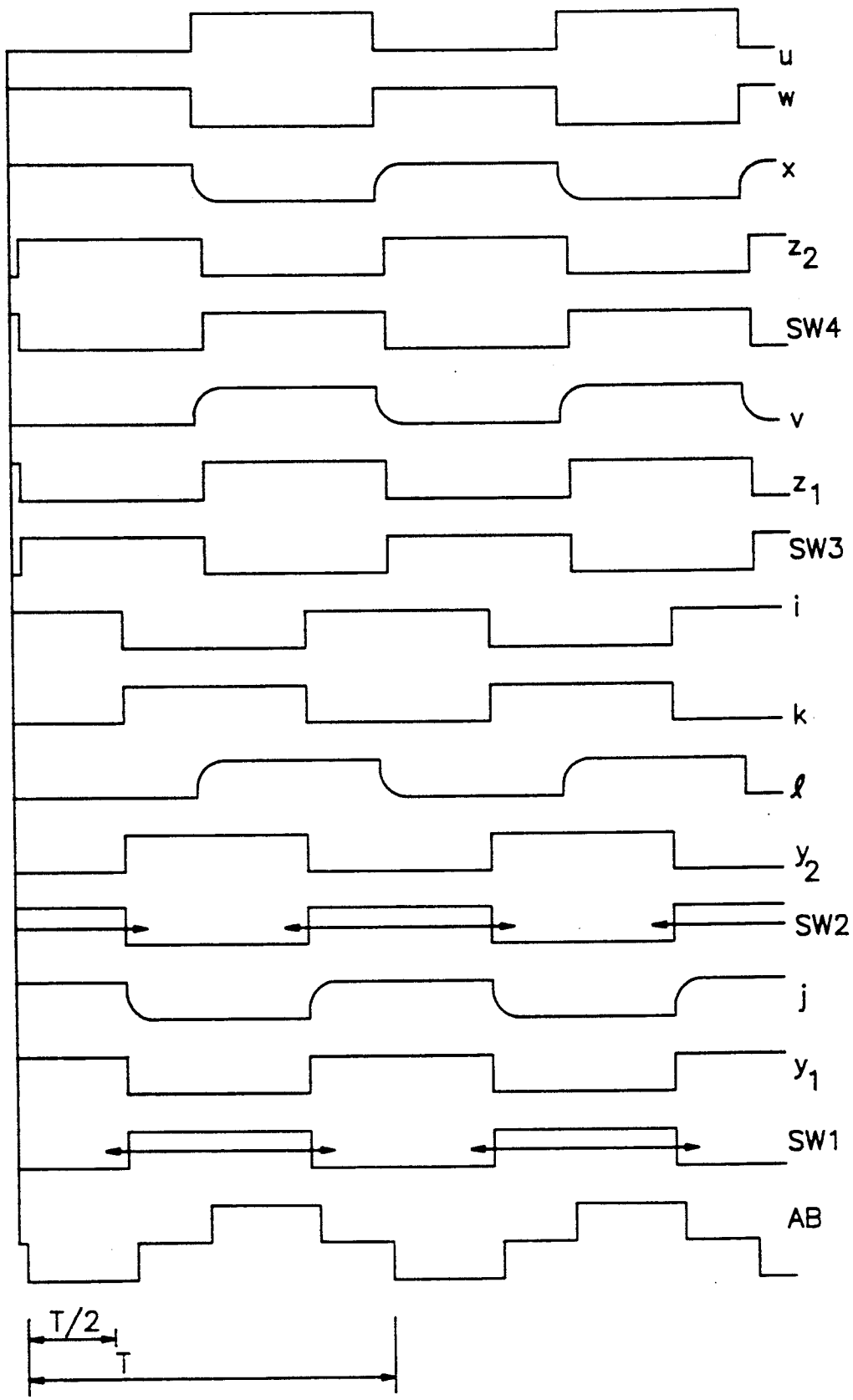
FIG. 4b illustrates a second half of logic signals of the control circuit.

Referring to FIG. 4a, 4b and FIG. 3, a regulated pulse width modulator $A_1$ generates two interleaved square wave signals (FIG. 4a) at $A_1$-pin 11 and $A_1$-pin 14, respectively, which are buffered and inverted by $A_{25}$ and $A_{21}$ of a hex inverting buffer integrated circuit (IC) $A_2$ to produce square wave signals m and a (FIG. 4A), in this example. The frequency and the width of the two square wave signals ($A_1$-pin 11 and $A_1$-pin 14) are controlled by the potentiometers $P_1$ and $P_2$ respectively. Their period T is determined by $R_1$, $C_1$, and $P_1$ while the width of the square wave output signals of $A_1$ is determined $P_2$ by controlling the trailing edge from 0 to T/2.

The square wave signal m is inverted again by $A_{26}$ of the $A_2$ IC to form a wave of which is applied to the input of a differentiation circuit comprising $R_8C_7$ and inverting buffer integrated circuit $A_{33}$ to detect the leading edge of the square wave input signal q. The output signal s of $A_{33}$ is inverted by inverter $A_{34}$ to produce a positive pulse t which is applied to the RESET input of an R/S Flip Flop $A_{42}$. The square wave signal m is also applied to the input of a differentiation circuit comprising $R_9C_8$ and inverter $A_{35}$ to detect the leading edge of the square wave signal m. The output signal 0 is inverted by inverter $A_{36}$ to produce a positive pulse p which is applied to the RESET input of flip flop $A_{41}$. The positive pulse t always stays the same position corresponding to the leading edge of the square wave signal q. In contrast, the positive pulse p is movable because its position corresponds to the leading edge of the square wave signal m which, in turn, corresponds to the trailing edge of the signal $A_1$-pin 11.

The square wave signal a is inverted by inverter $A_{22}$ and applied to the input of a differentiation circuit comprising $R_6C_5$ and inverter $A_{23}$ to detect the leading edge of the square input signal e. The output signal g of inverter $A_{23}$ is inverted by inverter $A_{31}$ to produce a positive pulse h which is applied to the SET input of R/S flip-flop $A_{42}$. The square wave signal "a" is also applied to the input of a differentiation circuit comprising $R_7C_6$ and inverter $A_{24}$ to detect the leading edge of the square wave signal "a". The output signal c is inverted by inverter $A_{32}$ to produce a positive pulse d which is applied to the SET input of flip-flop $A_{41}$. The positive pulse h always stays in same position which is corresponded to the leading edge of the square wave signal e. In contrast, the positive pulse d is movable because its position corresponds to the leading edge of the square wave signal a which, in turn, corresponds to the trailing edge of the signal $A_1$-pin 14.

When the positive pulse h is applied to the SET inputs of the R/S flip-flop $A_{42}$, the output signal u will change from low to high state and stays high until the positive pulse t is applied to the RESET inputs of flip-flop $A_{42}$. When a positive pulse t is applied to the RESET input of flip-flop $A_{42}$, the output u will change from high to low state and stays low until the next positive pulse h applied to the SET input of flip-flop $A_{42}$, the cycle then repeats. The output signal u is a square wave signal determined by the SET-RESET pulses h and tt.

When the positive pulse d is applied to the SET inputs of the R/S flip-flop $A_{41}$, the output signal i will change from low to high and stays high until the positive pulse p is applied to the RESET input of flip-flop $A_{41}$. When a positive pulse p is applied to the RESET inputs of flip-flop $A_{41}$, the output signal i will change from a high to a low state and stays low until the next positive pulse d applied to the SET inputs of flip-flop $A_{41}$. The cycle then repeats. The output signal i is a square wave signal determined by the SET-RESET pulses d and p.

The square wave signal u of flip-flop $A_{42}$ is inverted by inverter $A_{64}$ to produce a square wave signal w which is applied directly to the first input and to the second input, via a time delay circuit $R_{12}C_{11}$, of AND gate $A_{54}$. The square wave output signal $Z_2$ produced by two square wave input signals w and x is inverted by inverter $A_{65}$ to produce a square wave base drive signal SW4 to drive the power Darlington transistor $Q_4$ through an individual base drive amplifier circuit (identical to FIG. 5). The square wave signal u of flip-flop $A_{42}$ is also applied both directly to the first input of AND gate $A_{53}$, through a time delay circuit $R_{13}C_{12}$ to a second input of AND gate $A_{53}$. The square wave output signal $Z_1$ produced by the two square wave input signals u and v through AND gate $A_{53}$ is inverted by inverter $A_{66}$ to produce a square wave base drive signal SW3 to drive the power Darlington transistor $Q_3$ through an individual base drive amplifier circuit (identical to FIG. 5). The square wave base drive signals SW3 and SW4 are 180° out of phase and stay at a fixed position.

Figure 5:
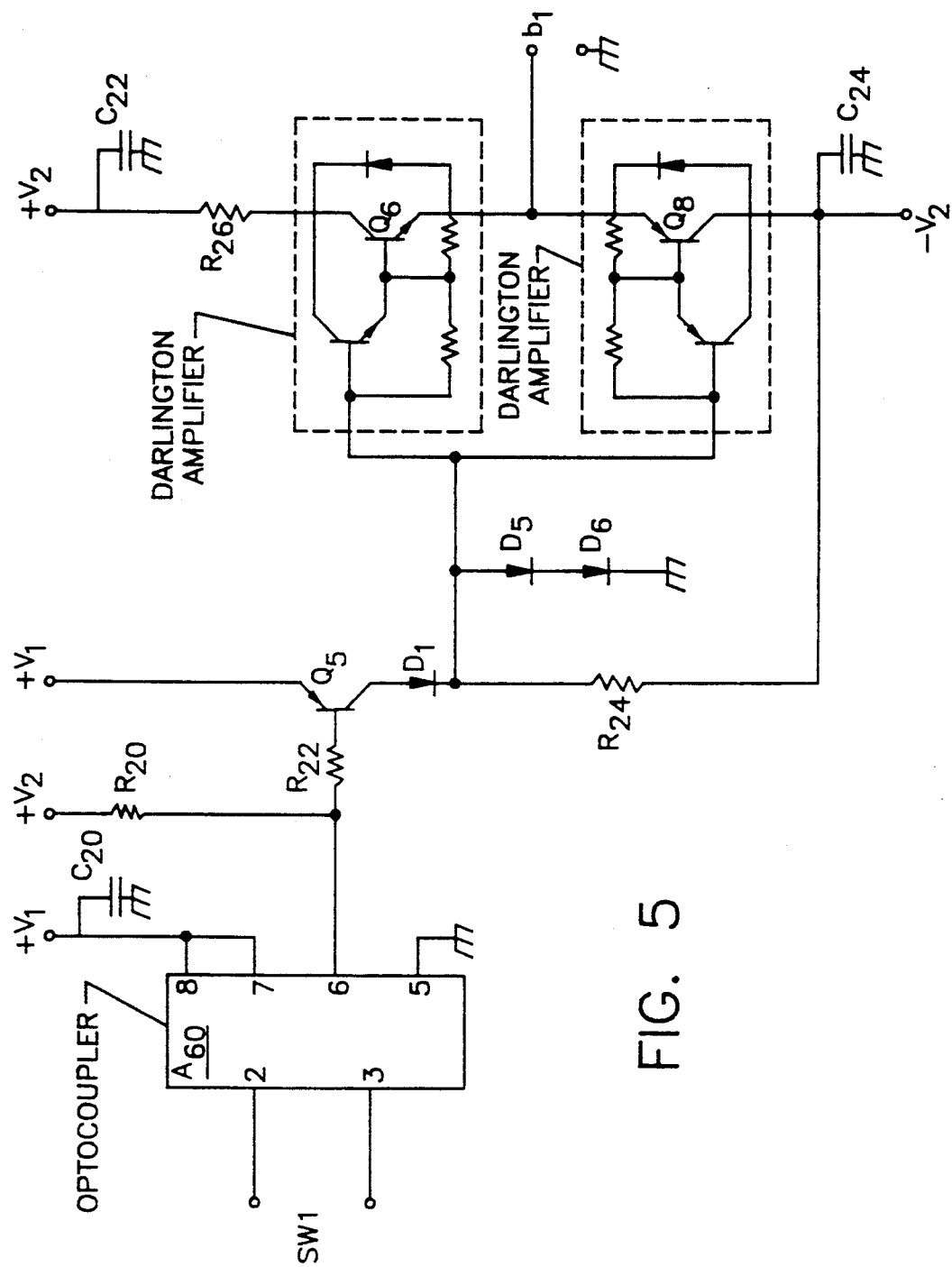
FIG. 5 is an electrical schematic diagram of one of four base drive amplifier circuits which drives one of four power transistors in a bridge inverter.

The square wave output signal i of flip-flop $A_{41}$ is inverted by inverter $A_{61}$ to produce a square wave signal k which is applied both directly to a first input of AND gate $A_{52}$, and through a time delay circuit $R_{10}C_9$ to the second input of AND gate $A_{52}$. The square wave output signal $Y_2$ produced by ANDING two square wave input signals k and l through AND gate $A_{52}$ is inverted by inverter $A_{62}$ to produce a square wave base drive SW2 to drive the power darlington transistor $Q_2$ through an individual base drive amplifier circuit as shown in FIG. 5. The square wave signal i is also applied directly to the first input of AND gate $A_{51}$, through a time delay circuit $R_{11}C_{10}$, to the second input of AND gate $A_{51}$.

The square wave output signal $Y_1$ produced by ANDING two square wave input signals i and j through AND gate $A_{51}$ is inverted by inverter $A_{63}$ to produce a square wave base drive signal SW1 to drive the power Darlington transistor $Q_1$ through an individual base drive amplifier circuit (FIG. 5). The square wave base drive signals SW1 and SW2 are 180° out of phase and movable. Their relative phase or positions are determined by the potentiometer $P_2$.

The overall operation of the control wave generator of FIG. 3 is as follows. If we consider pin 11 of the pulse width modulator $A_1$ to be a first source of uniformly spaced pulses, the pin 14 thereof is a second source of uniformly spaced pulses having leading edges respectively occurring half way between the leading edges of the pulses from the first pulse source. Variation in the widths of the pulses is controlled by changing the timing of their trailing edges as indicated by the arrows. The widths of pulses from both sources is changed in the same way by adjustment of $P_2$.

The flip flop $A_{41}$ produces output pulses i that occur between the pulses d and p at the trailing edges of the pulses from the pins 11 and 14 of modulator $A_1$. The pulses d and p are respectively applied to the set and reset inputs of the flip flop $A_{41}$. The differentiation circuit $C_6$, $R_7$ and the inverters $A_{21}$, $A_{24}$ and $A_{32}$ constitute means for deriving pulses d that occur at the trailing edges of the variable trailing edges of the pulses from the pin 14, and the differentiation circuit $C_8$, $R_9$ and inverters $A_{25}$, $A_{35}$ and $A_{36}$ constitute means for deriving pulses p that occur at the trailing edges of the variable trailing edges of the pulses from the pin 11. Since these trailing edges are separated by half of the period between the corresponding edges of the pulses from the pins 11 and 14, the pulses i will be of this duration and will advance and retard as the widths of the pulses at pins 11 and 14 are varied. The pulses i are processed to produce the pulses SW1 which become the pulses of the control wave a of FIG. 2 after amplification in a circuit like that of FIG. 5, and their inversion by inverter $A_{61}$ produces the pulses k, which in turn are processed to produce the pulses SW2 that become the pulses of the control wave b of FIG. 2 after amplification in a similar circuit to that of FIG. 5. Thus, as the widths of the pulses from the pins 11 and 14 is varied, the control waves a and b change in phase but remain 180° out of phase with each other.

The flip flop $A_{42}$ produces output pulses that occur between the leading edges of the pulses from the pins 11 and 14, and since the leading edges are not shifted in phase, the pulses u that becomes the pulses SW3 and in turn the control pulse of the wave c of FIG. 2 do not shift in phase. The control wave d of FIG. 2 is derived by inverting the pulses u. This is done as follows. The set input of the flip flop $A_{42}$ receives pulses h that occur at the leading edges of the pulses from the pin 14. The pulses h are derived by means including the inverters $A_{21}$, $A_{22}$, $A_{23}$ and $A_{31}$ and the differentiation circuit $C_5$ $R_6$. Similarly, the reset input of the flip flop $A_{42}$ receives pulses t that occur at the leading edges of the pulses from the pin 11. The pulses t are derived by means including the inverters $A_{25}$, $A_{26}$, $A_{33}$ and $A_{34}$ and the differentiation circuit $C_7$ $R_8$.

Referring to FIG. 5, the base drive signal SW1 which is applied to an optocoupler integrated circuit $A_{60}$ is amplified through the first amplifier $Q_5$ and the second complementary pair amplifier $Q_6$ and $Q_8$. The output signal $b_1$ of the second complementary pair amplifier $Q_6$, $Q_8$ is coupled to the base $b_1$ of the transistor $Q_1$ of the bridge inverter in FIG. 1. Similarly, the base drive signals SW2, SW3 and SW4 respectively are applied to the input of three other independent amplifiers, identical to the base drive circuit of FIG. 5. The output signals of the three independent amplifiers are coupled to the bases $b_2$, $b_3$ and $b_4$ of three transistors $Q_2$, $Q_3$ and $Q_4$ of the bridge inverter in FIG. 1. The optocoupler $A_{60}$ isolates the low voltage level of the control circuit 2 and the high voltage level of the bridge inverter. The circuit of FIG. 5 also includes by-pass capacitors $C_{20}$, $C_{23}$, and $C_{24}$; pull up resistors $R_{20}$, and $R_{26}$; coupler resistors $R_{22}$ and $R_{24}$; connected as shown. Power supply voltages $+V$, $+V_2$, and $-V_2$ are applied as shown to optocoupler $A_{60}$, transistor $Q_5$, and couplementary Darlington $Q_6$ and $Q_8$.

Components

The major circuit components of the controllable frequency ozonator (FIG. 1) are listed in Table 1:

TABLE 1

| | |
|---|---|
| $Q_1$, $Q_2$, $Q_3$ and $Q_4$ | Power Darlington transistor modules EVL31-050 Fuji |
| $D_1$ and $D_3$ | Fast switching power diode UES806R Unitrode |
| $D_2$ and $D_4$ | Fast switching power diode UES806 Unitrode |
| $D_5,D_6,D_7,D_8,D_9,D_{10}$ | Fast switching rectifier module ME200605 Powerex |
| $C_{f1}$ and $C_{f2}$ | 3.0 MF/400V polyester capacitor |
| $C_f$ | 2 × 3000 MF/350V electrolyte capacitor |

The parameters for circuit components of FIG. 3 are listed in Table 3:

TABLE 3

| | | | |
|---|---|---|---|
| $R_1$ | 1K | $C_1$ | 0.1 MF |
| $R_2,R_3$ | 6.8K | $C_2,C_4$ | 2.2 MF |
| $R_4,R_5,R_6,R_7,R_8,R_9$ | 1.2K | $C_3$ | 20 MF |
| $R_{10},R_{11},R_{12},R_{13}$ | 12K | $C_5,C_6,C_7,C_8$ | 56 pF |
| | | $C_9,C_{10},C_{11},C_{12}$ | 680 pF |
| $A_1$ | | SG3524 IC | |
| $A_2,A_3,A_6$ | | CD4049 IC | |
| $A_4$ | | CD4043 IC | |
| $A_5$ | | CD4081 IC | |

The parameters for the equivalent electrical circuit components are shown below:

| | |
|---|---|
| $C_{g1} =$ | 2.287 nF |
| $C_{g2} =$ | 2.195 nF |
| $C_d =$ | 13.26 nF |
| $R_{g1},R_{g2} =$ | power dependent |
| $R_d =$ | power dependent |

The parameters for circuit components of FIG. 5 are listed in Table 2:

TABLE 2

| | | | | | |
|---|---|---|---|---|---|
| $R_{20}$ | 1.2K | $C_{20}$ | 0.1 MF | $+V_1 =$ | $+5$ V |
| $R_{26}$ | 510 | $C_{23}$ | 10 MF | $+V_2 =$ | $+9$ V |
| $R_{22}$ | 390 | $C_{24}$ | 10 MF | $-V_2 =$ | $-9$ V |
| $R_{24}$ | 1 (5 W) | | | $D_1,D_2,D_3 =$ | 1N4937 F.S. |
| $A_{60}$ | | HCPL-2602 opto-coupler integrated circuit | | | |
| $Q_5$ | | 2N3467 pnp transistor | | | |
| $Q_6$ | | 2N6383 npn power Darlington transistor | | | |
| $Q_8$ | | 2N6648 pnp power Darlington transistor | | | |

Although various embodiments of the invention have been shown and described herein, they are not meant to be limiting. Certain modifications to these embodiments may occur to those of skill in the art, which modifications are meant to be covered by the spirit and scope of the appended claims.

What is claimed is:
1. A power supply comprising:
a source of D.C. voltage having positive and negative outputs;
first and second unilateral current conducting switches connected in series in the order named between said positive and negative outputs, respectively, said first and second switches meeting at a first junction;

first and second unilateral current conducting devices respectively connected in anti-parallel with said first and second switches;

third and fourth unilateral current conducting switches connected in series in the order named between said positive and negative outputs, said third and fourth switches meeting at a second junction;

third and fourth unilateral current conducting devices respectively connected in anti-parallel with said third and fourth switches;

a transformer having primary and secondary windings;

means for coupling said primary winding between said first and second junctions, whereby current is permitted to flow only in one direction between said outputs when either of said first and fourth switches or said second and third switches are conducting, said means for coupling exhibiting series resonance at a given frequency when said secondary winding is coupled to a load;

control means for biasing both said first and fourth switches for conduction, and both said second and third switches for conduction only during respective alternate periods of time having intervals between them, the sum of two periods and two intervals being greater than a period of said given frequency; and said control means biasing said third switch for conduction during intervals occurring immediately after the biasing of both said first and fourth switches for conduction ceases, and biasing said fourth switch for conduction during intervals occurring immediately after the biasing of both said second and third switches for conduction ceases.

2. A power supply as set forth in claim 1 wherein said control means comprises:

means for providing successive symmetrical rectangular control waves having a frequency less than said given frequency for controlling the conductivity of each of said switches;

the cycles of rectangular control waves for said first and second switches being 180° out of phase with each other;

the cycles of rectangular control waves for said third and fourth rectangular control waves being 180° out of phase with each other; and the cycles of the rectangular control waves for said first and second switches having a phase difference with the cycles of control waves for said third and fourth switches.

3. A power supply as set forth in claim 2 wherein said switches are transistors.

4. A power supply as set forth in claim 2 further comprising: means for changing said phase difference.

5. A power supply as set forth in claim 4 wherein said switches are transistors.

6. A power supply as set forth in claim 1 wherein said switches are transistors.

7. The power supply of claim 1, wherein said control means includes:

a first source of uniformly spaced pulses having a given repetition frequency;

a second source of uniformly spaced pulses having leading edges respectively occurring half way between the leading edges of the pulses from said first source;

means for varying the times of occurrence of the trailing edges of said pulses in the same way;

means for deriving a first series of respective pulses occurring between the trailing edges of consecutive pulses from said first and second sources, for application to a control terminal of said first unilateral current conducting switch;

means for deriving a second series of pulses that are 180° out of phase with said first series of pulses, for application to a control terminal of said second unilateral current conducting switch;

means for deriving a third series of pulses respectively occurring between the leading edges of consecutive pulses from said first and second sources, for application to a control terminal of said third unilateral current conducting switch; and means for deriving a fourth series of pulses that are 180° out of phase with respect to said third series of pulses, for application to a control terminal of said fourth unilateral current conducting switch.

8. The power supply of claim 1, wherein said control means includes:

a first source of spaced pulses;

a second source of spaced pulses having the same frequency as the pulses provided by the first source and interleaved therewith;

means for changing the widths of said pulse by varying the positions of their trailing edges;

a first inverter for inverting the pulses provided by said first source;

a first differentiation circuit coupled to said first inverter;

a first flip flop circuit having set and reset inputs and an output;

second and third inverters connected in series between said differentiation circuit and said set input of said first flip flop circuit;

a fourth inverter for inverting the pulses provided by said second source;

a second differentiation circuit coupled to an output terminal of said fourth inverter;

fifth and sixth inverters coupled in series between said second differentiation circuit and said reset input of said first flip flop circuit;

a first output terminal for applying a first control wave to a control terminal of said first unilateral current conducting switch;

a second output terminal for applying a second control wave to a control terminal of said second unilateral current conducting switch;

means for coupling said output of said first flip flop circuit to said first output terminal;

means for coupling said output of said first flip flop circuit to said second output terminal so that it is 180° out of phase with the control wave at said first output terminal;

a third differentiation circuit;

a seventh inverter coupled between an output terminal of said first inverter and an input terminal of said third differentiation circuit;

a second flip flop circuit having set and reset inputs and an output;

eighth and ninth inverters coupled in series between an output terminal of said third differentiation circuit and the set input of said second flip flop circuit;

a fourth differentiation circuit;

a tenth inverter coupled between an output terminal of said fourth inverter and an input terminal of said fourth differentiation circuit, for inverting the pulses provided by said second source of pulses;

eleventh and twelfth inverters coupled in series between an output terminal of said fourth differentiation circuit and said reset input of said second flip-flop circuit;

a third output terminal for applying said third control wave to a control terminal of said third unilateral current conducting switch;

a fourth output terminal for applying said fourth control wave to a control terminal of said fourth unilateral current conducting switch;

means for coupling an output terminal of said second flip flop circuit to said third terminal; and means for coupling an output terminal of said second flip flop circuit to said fourth output terminal so that it is 180° out of phase with the control wave at said third output terminal.

9. A power supply comprising:

a source of D.C. voltage having positive and negative outputs;

first and second unilateral current conducting switches connected in series in the order named between said positive and negative outputs, respectively, said first and second switches meeting at a first junction;

first and second unilateral current conducting devices respectively connected in anti-parallel with said first and second switches;

third and fourth unilateral current conducting switches connected in series in the order named between said positive and negative outputs;

third and fourth unilateral current conducting devices respectively connected in anti-parallel with said third and fourth switches;

a transformer having primary and secondary windings;

means for coupling said primary winding between said first and second junctions, whereby current is permitted to flow only in one direction between said outputs when either said first and fourth switches are conducting or said second and third switches are conducting, said means for coupling exhibiting series resonance at a given frequency;

said first and fourth switches being a first diagonal pair of switches, and said second and third switches being a second diagonal pair of switches; and control means for biasing both of said first diagonal pair of switches for conduction during a first period of time, one of said second diagonal pair of switches for conduction during a succeeding interval of time and both of said second diagonal pair of switches for conduction during a period of time following said succeeding interval.

10. A power supply comprising:

a source of D.C. voltage having positive and negative outputs;

first and second unilateral current conducting switches connected in series in the order named between said positive and negative outputs, respectively, said first and second switches meeting at a first junction;

first and second unilateral current conducting devices respectively connected in anti-parallel with said first and second switches;

third and fourth unilateral current conducting switches connected in series in the order named between said positive and negative outputs, said third and fourth switches meeting at a second junction;

third and fourth unilateral current conducting devices respectively connected in anti-parallel with said third and fourth switches;

a transformer having primary and secondary windings;

means for coupling said primary winding between said first and second junctions so as to permit current to flow in said one direction between said outputs when either said first and fourth switches are conducting or said second and third switches are conducting, said means for coupling exhibiting series resonance at a given frequency;

said first and fourth switches being a first diagonal pair of switches, and said second and third switches being a second diagonal pair of switches; and control means for biasing said first and second diagonal pairs of switches for conduction during respective alternate periods of time having intervals of time between them, and for biasing for conduction one of the diagonal pair of switches not biased for conduction during one period of the interval immediately following said one period of time.

11. Apparatus comprising:

a first source of uniformly spaced pulses having a given repetition frequency;

a second source of uniformly spaced pulses having leading edges respectively occurring half way between the leading edges of the pulses from said first source;

means for varying in the same way the times of occurrence of the trailing edges of pulses from said first and second sources, respectively;

means for deriving a first series of respective pulses occurring between the trailing edges of consecutive pulses from said first and second sources;

means for deriving a second series of pulses that are 180° out of phase with said first series of pulses;

means for deriving a third series of pulses respectively occurring between the leading edges of consecutive pulses from said first and second sources;

means for deriving a fourth series of pulses that are 180° out of phase with respect to said third series of pulses;

a power supply having positive and negative outputs;

first and second transistors connected in series with like polarity between said positive and negative outputs, said transistors meeting at a first junction and having control electrodes;

third and fourth transistors connected in series with like polarity between said positive and negative outputs, said transistors meeting at a second junction and having control electrodes;

diodes respectively connected in anti-parallel with each transistor;

means for coupling said means for deriving said first, second, third, and fourth series of pulses to the control electrodes of said first, second, third, and fourth transistors, respectively;

a transformer having primary and secondary windings; and means for coupling said primary winding between said first and second junctions, said means being such that series resonance is exhibited between said junctions at a frequency greater than said given frequency.

* * * * *